United States Patent
Sasaki et al.

(10) Patent No.: US 9,680,667 B2
(45) Date of Patent: Jun. 13, 2017

(54) ADAPTIVE EQUALIZATION CIRCUIT, DIGITAL COHERENT RECEIVER, AND ADAPTIVE EQUALIZATION METHOD

(71) Applicant: FUJITSU LIMITED, Kawasaki-shi, Kanagawa (JP)

(72) Inventors: Daisuke Sasaki, Yokohama (JP); Kazuhiko Hatae, Kawasaki (JP); Tomoki Katou, Kawasaki (JP); Nobukazu Koizumi, Kawasaki (JP); Masato Oota, Atsugi (JP); Yasuo Ohtomo, Yokohama (JP); Manabu Yamazaki, Fuchu (JP); Masashi Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/203,004

(22) Filed: Jul. 6, 2016

(65) Prior Publication Data

US 2017/0012803 A1 Jan. 12, 2017

(30) Foreign Application Priority Data

Jul. 9, 2015 (JP) .................................. 2015-137587

(51) Int. Cl.
| | | |
|---|---|---|
| *H04L 25/03* | (2006.01) | |
| *H04B 10/61* | (2013.01) | |
| *H04L 25/02* | (2006.01) | |

(52) U.S. Cl.
CPC ... *H04L 25/03019* (2013.01); *H04B 10/6162* (2013.01); *H04B 10/6164* (2013.01); *H04L 25/0224* (2013.01); *H04L 2025/03681* (2013.01)

(58) Field of Classification Search
CPC ............ H04B 10/6162; H04B 10/6164; H04L 2025/03681; H04L 25/03019; H04L 27/2662; H04L 27/2695; H04L 27/266
(Continued)

(56) References Cited

U.S. PATENT DOCUMENTS

| 6,725,024 B1 * | 4/2004 | Lindoff ............... H04L 25/0202 375/344 |
| 2002/0145971 A1 * | 10/2002 | Cho .................... H04L 25/0204 370/208 |

(Continued)

FOREIGN PATENT DOCUMENTS

| JP | 2003-198651 | 7/2003 |
| JP | 2012-244255 | 12/2012 |

(Continued)

*Primary Examiner* — Emmanuel Bayard
(74) *Attorney, Agent, or Firm* — Staas & Halsey LLP

(57) ABSTRACT

A circuit includes a calculation circuit configured to calculate a noise power of a predetermined-training-sequence pattern repeatedly included in a first signal input into an adaptive equalizer, based on a second signal obtained by compensating the first signal by a compensation circuit, a channel-estimation value based on the second signal, and the predetermined-training-sequence pattern; and an average circuit configured to obtain an average value of estimation values of frequency offsets based on the predetermined-training-sequence pattern having the noise power equal to or smaller than a predetermined power, among estimation values of frequency offsets based on the predetermined-training-sequence pattern, wherein the compensation circuit is configured to compensate a frequency offset of the predetermined-training sequence pattern based on the average value and thereby obtain the second signal, and the adaptive equalizer is configured to perform adaptive-equalization processing of the first signal with a setting value based on the second signal.

12 Claims, 13 Drawing Sheets

(58) Field of Classification Search
USPC .................................................. 375/229–232
See application file for complete search history.

(56) References Cited

U.S. PATENT DOCUMENTS

| | | | | |
|---|---|---|---|---|
| 2003/0138064 A1* | 7/2003 | Malouche | ............... | H04L 7/042 375/344 |
| 2005/0107039 A1* | 5/2005 | Lindoff | ............... | H04B 1/1027 455/63.1 |
| 2006/0023799 A1* | 2/2006 | Kang | ................... | H04L 25/022 375/260 |
| 2006/0088135 A1* | 4/2006 | Desperben | ......... | H04L 25/0212 375/346 |
| 2006/0120267 A1* | 6/2006 | De Bart | ............. | H04L 25/0236 370/208 |
| 2006/0133547 A1* | 6/2006 | He | ..................... | H04L 25/0216 375/346 |
| 2006/0182015 A1* | 8/2006 | Kim | ................... | H04L 27/2657 370/203 |
| 2006/0198449 A1* | 9/2006 | De Bart | ............. | H04L 25/0236 375/260 |
| 2007/0047671 A1* | 3/2007 | Chen | .................. | H04L 25/0204 375/326 |
| 2007/0153930 A1* | 7/2007 | Reid | ................... | H04L 25/0228 375/260 |
| 2007/0211809 A1* | 9/2007 | Kim | ................... | H04L 27/2695 375/260 |
| 2009/0304023 A1* | 12/2009 | Stadelmeier | ............ | H04L 5/005 370/464 |
| 2010/0329683 A1* | 12/2010 | Liu | ................... | H04B 10/2513 398/81 |
| 2012/0082274 A1* | 4/2012 | Bury | ................... | H04L 25/0202 375/346 |
| 2014/0079408 A1 | 3/2014 | Yan et al. | | |
| 2016/0218830 A1* | 7/2016 | Martinez | ............... | H04L 1/1845 |

FOREIGN PATENT DOCUMENTS

JP     2013-123161      6/2013
JP      2014-60708      4/2014

* cited by examiner

ADAPTIVE EQUALIZATION CIRCUIT, DIGITAL COHERENT RECEIVER, AND ADAPTIVE EQUALIZATION METHOD

CROSS-REFERENCE TO RELATED APPLICATION

This application is based upon and claims the benefit of priority of the prior Japanese Patent Application No. 2015-137587, filed on Jul. 9, 2015, the entire contents of which are incorporated herein by reference.

FIELD

The embodiment discussed herein is related to an adaptive equalization circuit, a digital coherent receiver, and an adaptive equalization method.

BACKGROUND

Heretofore, there has been known a digital coherent receiver that converts information of both of the amplitude and phase of light to electric currents and decodes data by a digital processing. The digital coherent receiver uses, for example, an adaptive equalizer (AEQ) configured to perform adaptive equalization processing for dealing with temporal variation in propagation characteristic of the optical transmission path. Also, in the optical communication and radio communication, there has been also known a technique of compensating an offset (frequency offset) between an oscillation frequency on the transmission side and an oscillation frequency on the reception side (for example, see Japanese Laid-open Patent Publication Nos. 2012-244255, 2003-198651, 2013-123161, and 2014-060708).

However, the technique described above has a problem that when the transmission path of the optical signal is long, for example, noise generated in the optical signal is so large that it is difficult to estimate the frequency offset with high accuracy.

For this reason, the technique described above is unable to achieve high accuracies in channel estimation and setting of the AEQ based on the channel estimation or the result of the channel estimation, and consequently has a problem that the distortion caused in the optical signal by transmission path characteristics may not be compensated by the AEQ with high accuracy.

According to one aspect, it is an object of the embodiment to provide an adaptive equalization circuit, a digital coherent receiver, and an adaptive equalization method capable of obtaining a highly accurate estimation value of a frequency offset by reducing effects in the noise.

SUMMARY

According to an aspect of the embodiments, an adaptive equalization circuit includes: a calculation circuit configured to calculate a noise power of a predetermined training sequence pattern repeatedly included in a first signal input into an adaptive equalizer, based on a second signal obtained by compensating the first signal by a compensation circuit, a channel estimation value based on the second signal, and the predetermined training sequence pattern; and an average circuit configured to obtain an average value of estimation values of frequency offsets based on the predetermined training sequence pattern having the noise power equal to or smaller than a predetermined power, among estimation values of frequency offsets based on the predetermined training sequence pattern, wherein the compensation circuit is configured to compensate a frequency offset of the predetermined training sequence pattern based on the average value and thereby obtain the second signal, and the adaptive equalizer is configured to perform adaptive equalization processing of the first signal with a setting value based on the second signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment of an adaptive equalization circuit, a digital coherent receiver and an adaptive equalization method according to the present disclosure are described in detail with reference to the accompanying drawings.

Adaptive Equalization Circuit According to Embodiment

Figure 1:
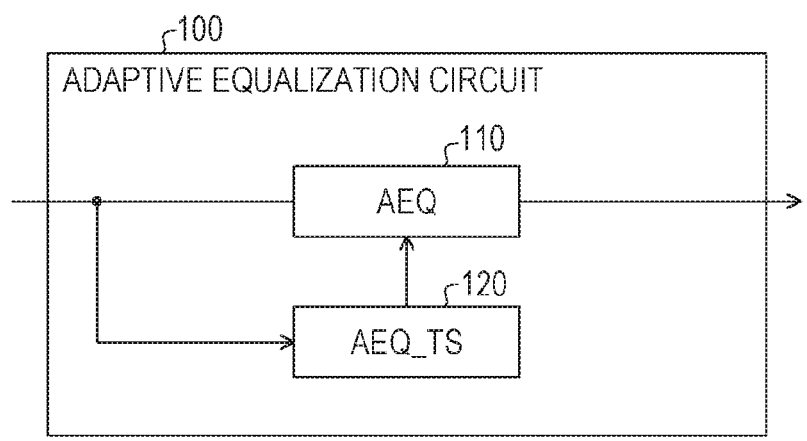
FIG. 1 illustrates an example of an adaptive equalization circuit according to an embodiment.

FIG. 1 illustrates an example of an adaptive equalization circuit according to an embodiment. As illustrated in FIG. 1, the adaptive equalization circuit 100 according to the embodiment includes an AEQ 110 and an AEQ_TS 120. The adaptive equalization circuit 100 may be applied, for example, to a digital processor of a digital coherent receiver.

The AEQ 110 is an adaptive equalization section configured to perform adaptive equalization processing of a signal (target signal) input into the adaptive equalization circuit 100. The AEQ 110 outputs a signal obtained by adaptive equalization processing. The adaptive equalization processing is a processing in which a distortion of a reception signal caused by transmission path characteristics is compensated according to the fluctuation of the transmission path characteristics in an adaptive manner. The AEQ 110 may be implemented, for example, by a finite impulse response (FIR) filter having a plurality of taps (for example, see FIGS. 6 and 7).

The AEQ_TS 120 is configured to set an initial value of the tap coefficient in the AEQ 110 based on a training sequence (TS) pattern repeatedly included in a signal input into the adaptive equalization circuit 100. The TS pattern is a training signal comprising a known predetermined symbol sequence in the adaptive equalization circuit 100.

For example, the AEQ_TS 120 calculates a noise power (power of noise) of the TS pattern repeatedly included in a signal input into the adaptive equalization circuit 100. The noise power may be calculated based on the TS pattern, channel estimation value based on the TS pattern, and a known symbol (predetermined symbol) of the TS pattern.

The TS pattern used for calculation of the noise power is, for example, a TS pattern acquired from a signal input into the adaptive equalization circuit 100. Therefore, the TS pattern includes a distortion compensated in the adaptive equalization processing by the AEQ 110. The channel estimation value used for calculation of the noise power is, for example, a channel estimation value with the frequency offset compensated by an estimation value of the frequency offset not subjected to an averaging described below. The known symbol used for calculation of the noise power is a symbol of a TS pattern not including the distortion compensated in the adaptive equalization processing by the AEQ 110.

The AEQ_TS 120 holds the estimation value of the frequency offset based on a TS pattern in which the calculated noise power is equal to or smaller than a predetermined power, among estimation values of the frequency offsets based on the TS pattern repeatedly included in a signal input into the adaptive equalization circuit 100. That is, the AEQ_TS 120 discards estimation values of frequency offsets based on a TS pattern in which the calculated noise power is larger than the predetermined power, among the estimation values of the frequency offsets based on the TS pattern repeatedly included in a signal input into the adaptive equalization circuit 100.

Then, the AEQ_TS 120 compensates the frequency offset of the TS pattern based on an estimation value obtained by averaging multiple estimation values held thereby. Also, the AEQ_TS 120 calculates a setting value of the AEQ 110 according to a TS pattern subjected to the frequency offset compensated based on the averaged estimation value. The setting value of the AEQ 110 is, for example, an initial value of the tap coefficient of the above-mentioned FIR filter. Then, the AEQ-TS 120 sets the calculated setting value to the AEQ 110.

Thus, the AEQ_TS 120 averages multiple estimation values of the frequency offsets based on a TS pattern in which the calculated noise power is equal to or smaller than the predetermined power, among the estimation values of the frequency offsets based on the TS pattern included in an input signal. Thus, noise effects may be reduced and a highly accurate estimation value of the frequency offset may be obtained.

Also, the AEQ_TS 120 calculates a setting value of the AEQ 110 according to a TS pattern subjected to the frequency offset compensated based on an averaged estimation value. Thus, a distortion generated in the optical signal by transmission path characteristics may be compensated by the AEQ 110 with high accuracy.

Figure 2:
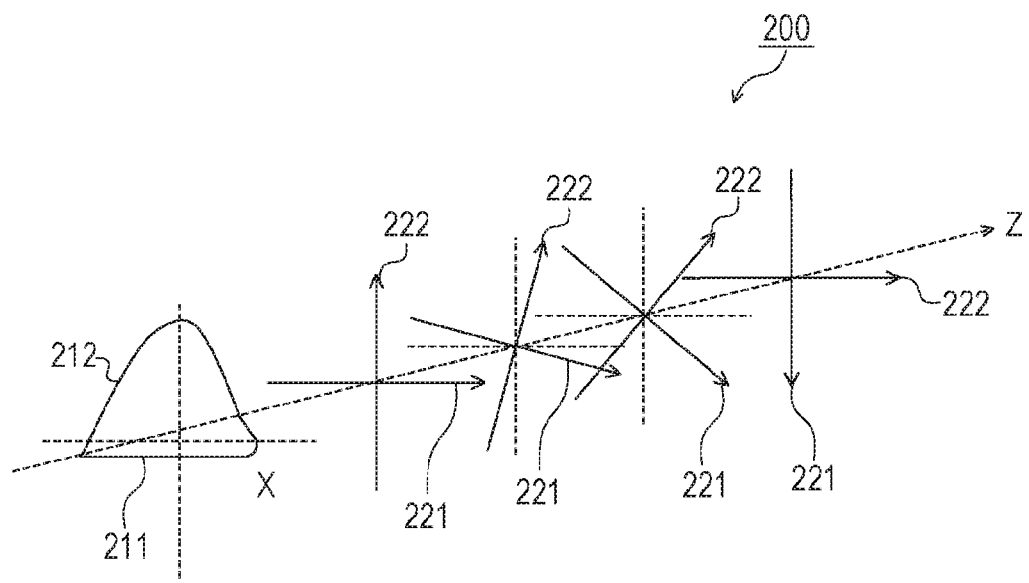
FIG. 2 illustrates an example of transmission path characteristics compensated by an AEQ according to the embodiment.

Transmission Path Characteristics of Compensation Target by AEQ According to Embodiment FIG. 2 illustrates an example of transmission path characteristics compensated by the AEQ according to the embodiment. The AEQ 110 illustrated in FIG. 1 compensates, for example, for a polarized wave rotation 200 illustrated in FIG. 2. The polarized wave rotation 200 is a phenomenon in which the polarization direction of the optical signal rotates in the transmission path. Z direction illustrated in FIG. 2 indicates the travel direction of the optical signal in the transmission path. In the example illustrated in FIG. 2, a polarization direction 221 of an X-polarization component 211 included in the optical signal and a polarization direction 222 of a Y-polarization component 212 included in the optical signal respectively rotate by 90 degrees by traveling in the Z direction of the transmission path.

Figure 3:
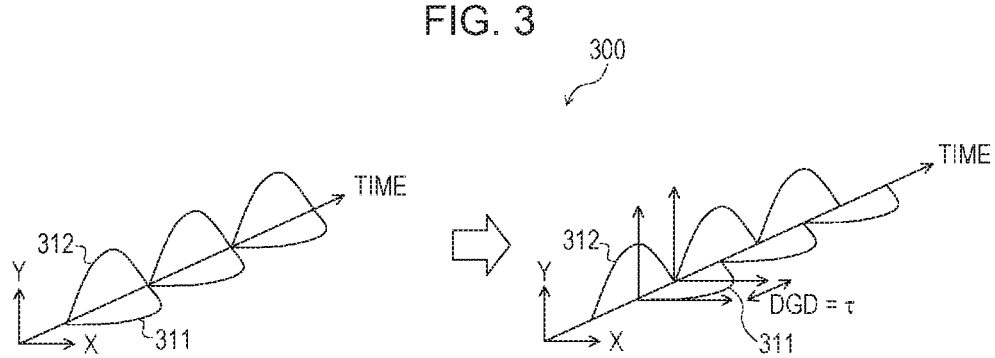
FIG. 3 illustrates another example of the transmission path characteristics compensated by the AEQ according to the embodiment.

FIG. 3 illustrates another example of transmission path characteristics compensated by the AEQ according to the embodiment. The AEQ 110 illustrated in FIG. 1 compensates, for example, for the delay difference between polarized waves 300 illustrated in FIG. 3. The delay difference between polarized waves 300 is a differential group delay (DGD) generating a delay difference in the transmission path between the X-polarization component 311 included in the optical signal and the Y-polarization component 312 included in the optical signal. In the example illustrated in FIG. 3, DGD=τ is generated between the X-polarization component 311 and the Y-polarization component 312 included in the optical signal traveling in the transmission path.

Figure 4:
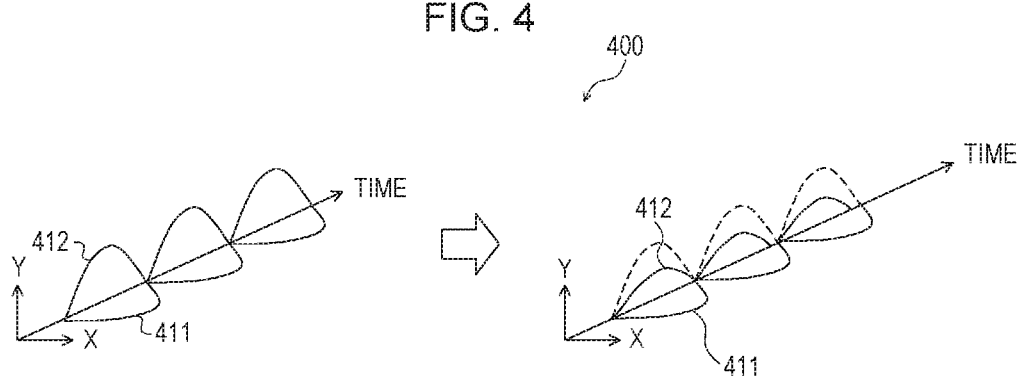
FIG. 4 illustrates a still another example of the transmission path characteristics compensated by the AEQ according to the embodiment.

FIG. 4 illustrates a still another example of transmission path characteristics compensated by the AEQ according to the embodiment. The AEQ 110 illustrated in FIG. 1 compensates, for example, for a loss difference 400 between polarized waves illustrated in FIG. 4. The loss difference 400 between polarized waves is a polarization dependent loss (PDL) of a loss difference between the X-polarization component 411 included in the optical signal and the Y-polarization component 412 included in the optical signal in the transmission path.

Transmission path characteristics illustrated in FIGS. 2 to 4 depend on the installation condition of the transmission path and fluctuate even during operation (communication). On the other hand, the AEQ 110 restores the transmission signal by applying an inverse transmission path characteristic filter to separated polarization components, for example, while compensating transmission path characteristics illustrated in FIGS. 2 to 4 and following up fluctuation of the transmission path characteristics.

Digital Coherent Receiver According to Embodiment

Figure 5:
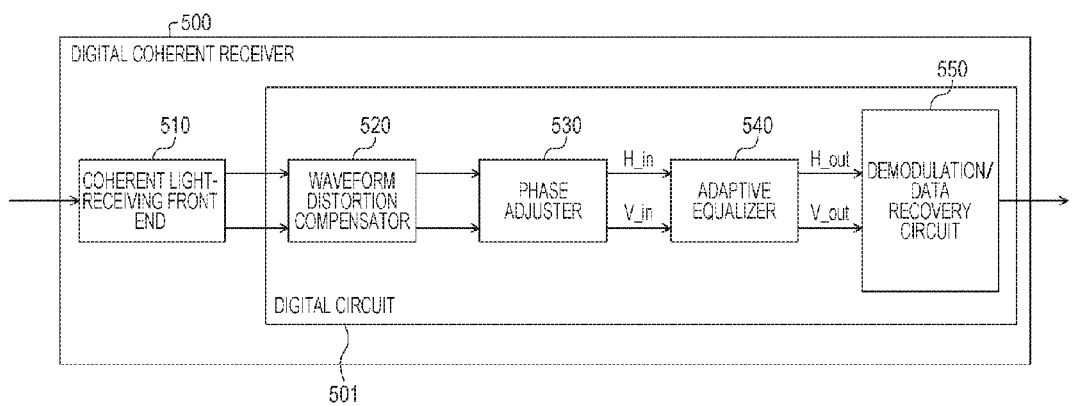
FIG. 5 illustrates an example of a digital coherent receiver according to the embodiment.

FIG. 5 illustrates an example of a digital coherent receiver according to the embodiment. As illustrated in FIG. 5, the digital coherent receiver 500 according to the embodiment includes a coherent light-receiving front end 510, a waveform distortion compensator 520, a phase adjuster 530, an adaptive equalizer 540, and a demodulation/data recovery circuit 550. The adaptive equalization circuit 100 illustrated in FIG. 1 may be applied, for example, to the adaptive equalizer 540.

The digital coherent receiver 500 mixes, for example, the reception signal and local oscillation light source with each other by an optical phase hybrid device, and extracts components of the electric field and phase of the reception signal. Then, the digital coherent receiver 500 performs photoelectric conversion, analog/digital (A/D) conversion and digital signal processing of the extracted components and thereby restores transmission data from the reception signal.

The waveform distortion compensator 520, phase adjuster 530, adaptive equalizer 540 and demodulation/data recovery circuit 550 may be implemented, for example, by one or more digital circuits 501. Various digital circuits such as, for example, a digital signal processor (DSP) and/or a field programmable gate array (FPGA) may be used as a digital circuit 501.

The coherent light-receiving front end 510 is a light front-end (received light processing section) configured to perform coherent reception of an optical signal input into the digital coherent receiver 500 via the transmission path by using local oscillation light of the digital coherent receiver 500.

For example, the coherent light-receiving front end 510 receives the optical signal and local oscillation light by mixing with each other. Thus, a signal of the H-axis polarization component and a signal of the V-axis polarization component included in the optical signal input into the digital coherent receiver 500 from the transmission path are obtained. The H-axis polarization component and the V-axis polarization component are polarization components with the polarization direction thereof quadrature to each other. The H-axis polarization component and the V-axis polarization component include, for example, an I channel (in-phase) component and a Q channel (quadrature) component respectively.

The coherent light-receiving front end 510 converts obtained signals of the H-axis polarization component and V-axis polarization component into digital signals and outputs converted digital signals to the waveform distortion compensator 520.

The waveform distortion compensator 520 compensates the distortion component of signals output from the coherent light-receiving front end 510. The distortion component compensated by the waveform distortion compensator 520 is, for example, a distortion component generated by wavelength dispersion. The waveform distortion compensator 520 outputs signals with the compensated distortion component to the phase adjuster 530.

The phase adjuster 530 performs phase adjustment of signals output from the waveform distortion compensator 520. Thus, among phase differences between the optical signal and local oscillation light in each of the signals, a phase difference caused by phase fluctuation of the local oscillation light may be compensated. The phase adjuster 530 outputs signals subjected to the phase adjustment to the adaptive equalizer 540.

The adaptive equalizer 540 performs adaptive equalization processing based on signals (H_in, V_in) of the H-axis polarization component and V-axis polarization component output from the phase adjuster 530. Then, the adaptive equalizer 540 outputs signals (H_out, V_out) obtained by the adaptive equalization processing to the demodulation/data recovery circuit 550.

For example, in the adaptive equalization processing, the adaptive equalizer 540 separates and extracts signals of the H polarization component and V polarization component transmitted from the transmission side. In the adaptive equalization processing, the adaptive equalizer 540 equalizes residual wavelength dispersion and polarization mode dispersion which is equalization residue of the waveform distortion compensator 520, and the waveform distortion component due to band limitation such as wavelength multiplexing in an adaptive manner.

The demodulation/data recovery circuit 550 is a decode section configured to perform demodulation/data recovery (decoding) based on signals output from the adaptive equalizer 540. For example, the demodulation/data recovery circuit 550 determines the combination of the phase and amplitude indicated by signals output from the adaptive equalizer 540 and thereby performs demodulation and data recovery of the signals. The demodulation/data recovery circuit 550 outputs data obtained by demodulation and data recovery.

AEQ According to Embodiment

Figure 6:
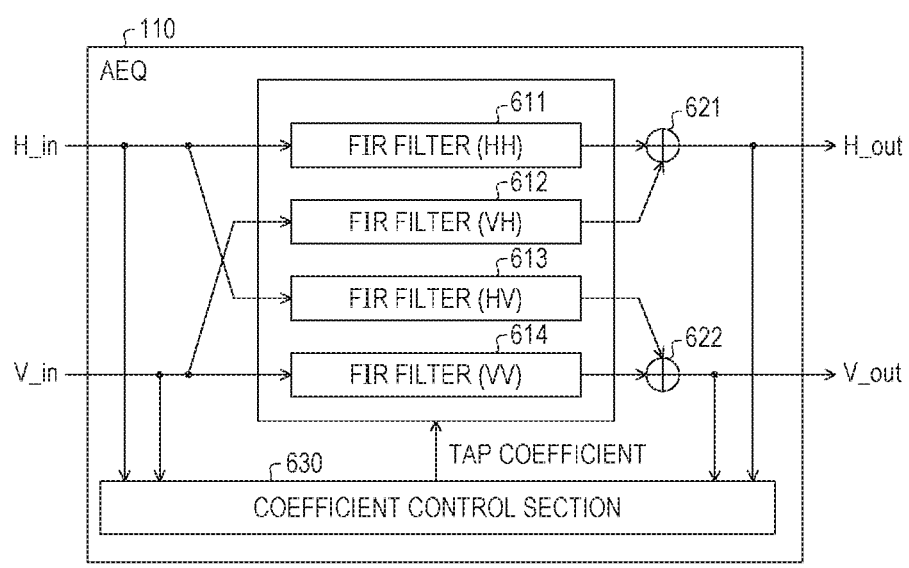
FIG. 6 illustrates an example of the AEQ according to the embodiment.

FIG. 6 illustrates an example of the AEQ according to the embodiment. The AEQ 110 illustrated in FIG. 1 includes, for example, FIR filters 611 to 614, addition sections 621 to 622 and a coefficient control section 630 as illustrated in FIG. 6. Each of FIR filters 611 to 614 is a butterfly type FIR filter having N (N is a natural number larger than 2) taps.

For example, the signal (H_in) of the H polarization component input into the AEQ 110 is an H polarization component when an optical signal is received without compensating the polarized wave rotation generated in the transmission path. For this reason, the H polarization component and V polarization component on transmission of the optical signal co-exist in the signal (H_in) of the H polarization component input into the AEQ 110.

Similarly, the signal (V_in) of the V polarization component input into the AEQ 110 is a V polarization component when an optical signal is received without compensating the polarized wave rotation generated in the transmission path. For this reason, the H polarization component and V polarization component on transmission of the optical signal co-exist in the signal (V_in) of the V polarization component input into the AEQ 110.

The FIR filter 611 (HH) extracts the H polarization component on transmission from the signal (H_in) of the H polarization component input into the AEQ 110. The FIR filter 612 (VH) extracts the H polarization component on transmission from the signal (V_in) of the V polarization component input into the AEQ 110. Each of FIR filters 611, 612 outputs the extracted H polarization component to the addition section 621.

The FIR filter 613 (HV) extracts the V polarization component on transmission from the signal (H_in) of the H polarization component input into the AEQ 110. The FIR filter 614 (W) extracts the V polarization component on transmission from the signal (V_in) of the V polarization component input into the AEQ 110. Each of FIR filters 613, 614 outputs the extracted V polarization component to the addition section 622.

The addition section 621 adds H polarization components output from FIR filters 611, 612 and outputs the addition result as a signal (H_out) of the H polarization component. The addition section 622 adds V polarization components output from FIR filters 613, 614 and outputs the addition result as a signal (V_out) of the V polarization component. Thus, the AEQ 110 may output the signal (H_out) of the H polarization component and the signal (V_out) of the V polarization component on transmission by extracting from input signals of the H polarization component and the V polarization component respectively.

The coefficient control section 630 is configured to set the initial value of each tap coefficient in FIR filters 611 to 614. The coefficient control section 630 updates each tap coefficient in FIR filters 611 to 614 so as to follow up fluctuation of transmission path characteristics by performing a feedback processing based on signals output from addition sections 621, 622. An output of the AEQ_TS 120 may be applied to setting the initial value of the tap coefficient in the coefficient control section 630. The coefficient control section 630 may repeat setting of the initial value of each tap coefficient in FIR filters 611 to 614, for example, when the reception quality such as the bit error rate (BER) in the demodulation/data recovery circuit 550 is lower than a threshold.

FIR Filters According to Embodiment

Figure 7:
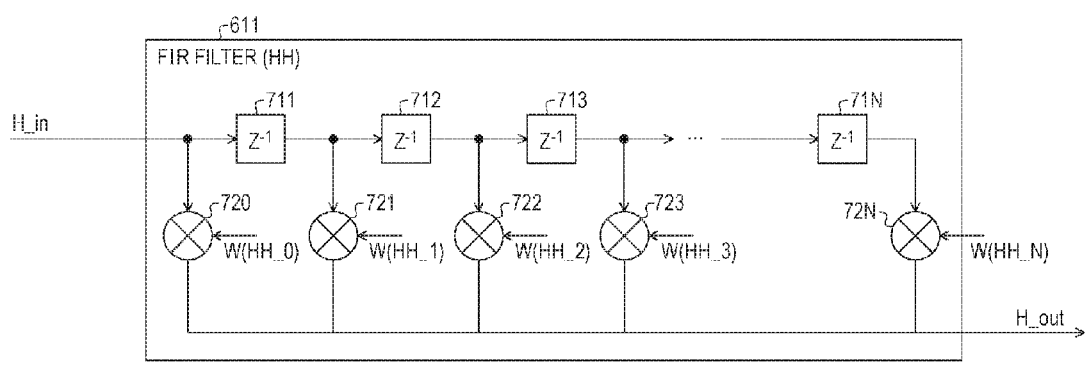
FIG. 7 illustrates an example of FIR filters according to the embodiment.

FIG. 7 illustrates an example of FIR filters according to the embodiment. Among FIR filters 611 to 614 illustrated in FIG. 6, configuration of the FIR filter 611 is illustrated in FIG. 7. However, configuration of FIR filters 612 to 614 is the same as the FIR filter 611. As illustrated in FIG. 7, the FIR filter 611 includes N delay sections 711 to 71N ($Z^{-1}$) and N+1 multiplication sections 720 to 72N.

For example, the delay section 711 delays the signal (H_in) input into the FIR filter 611 and outputs the delayed signal to the delay section 712 and multiplication section 721. The delay section 712 delays the signal output from the delay section 711 and outputs the delayed signal to the delay section 713 and multiplication section 722. The delay section 71N delays the signal output from the delay section 71(N−1) and outputs the delayed signal to the multiplication section 72N.

For example, the multiplication section 720 multiplies the signal (H_in) input into the FIR filter 611 by the tap coefficient W(HH_0). The multiplication section 721 multiplies the signal output from the delay section 711 by the tap coefficient W(HH_1). The multiplication section 72N multiplies the signal output from the delay section 71N by the tap coefficient W(HH_N). Multiplication results by multiplication sections 720 to 72N are added together and output from the FIR filter 611 as a filtered signal (H_out).

The coefficient control section 630 illustrated in FIG. 6 sets the initial value of tap coefficients W(HH_1) to W(HH_N) input into multiplication sections 720 to 72N. The coefficient control section 630 updates tap coefficients W(HH_1) to W(HH_N) input into multiplication sections 720 to 72N by a feedback processing which causes the tap coefficients to follow up a change of transmission path characteristics.

Here, the coefficient control section 630 changes tap coefficients gradually by the feedback processing. Thus, if a set initial value of the tap coefficient deviates from an appropriate value, updating of the tap coefficient by the feedback processing may fail.

On the other hand, the coefficient control section 630 (AEQ_TS 120) calculates an appropriate initial value of the tap coefficient by using a training sequence (TS) included in the received signal. For example, the coefficient control section 630 identifies a section of the TS, and compensates for frequency offset of the signal with reference to an estimation value of the frequency offset based on the signal in the identified section of the TS. Then, the coefficient control section 630 performs channel estimation based on the signal for which the frequency offset is compensated, and calculates an initial value of the tap coefficient based on the result of the channel estimation.

Figure 8:
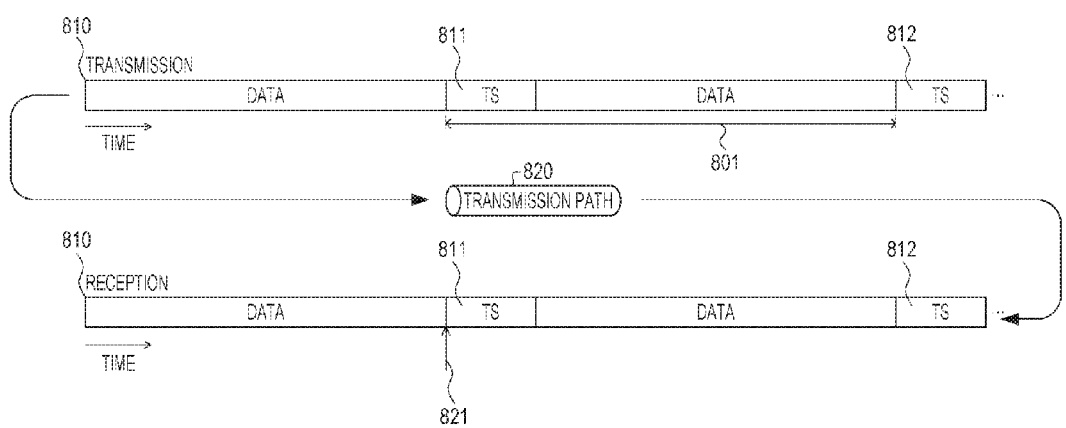
FIG. 8 illustrates an example of calculation of an initial value of a tap coefficient by estimation of the TS position according to the embodiment.

Calculation of Initial Value of Tap Coefficient by TS Position Estimation According to Embodiment FIG. 8 illustrates an example of calculation of the initial value of the tap coefficient by TS position estimation according to the embodiment. In FIG. 8, the horizontal direction indicates time. The signal 810 is a signal which is transmitted from the transmission side via the transmission path 820 and input into the digital coherent receiver 500.

The transmission side stores TSs 811, 812, . . . into the signal 810 at regular intervals. TSs 811, 812, . . . comprise a pattern known to the transmission side and the digital coherent receiver 500. The cycle 801 is a cycle in which TSs 811, 812, . . . are stored into the signal 810.

The AEQ_TS 120 estimates the position (timing) of the TS based on the data pattern of the signal 810. In the example illustrated in FIG. 8, assume that the AEQ-TS 120 derives the estimated TS position 821 as an estimation result of the TS 811 position. The AEQ_TS 120 performs channel estimation by comparing a signal at the estimated TS position 821 in the signal 810 and a known TS pattern (TS symbol) with each other. The channel estimation is, for example, estimation of the characteristic (impulse response) of the transmission path 820.

The digital coherent receiver 500 calculates an initial value of the above tap coefficients of the AEQ 110 by determining a characteristic reverse to the result of channel estimation (channel estimation value). For example, assuming that a signal at the estimated TS position 821 in the signal 810 is R, a known TS pattern is S, and a characteristic of the transmission path 820 is W, R=WS. Therefore, the AEQ_TS 120 may calculate an initial value of tap coefficients of the AEQ 110 by deriving $W^{-1}$ satisfying $S=W^{-1}R$.

Frequency Offset According to Embodiment

Figure 9:
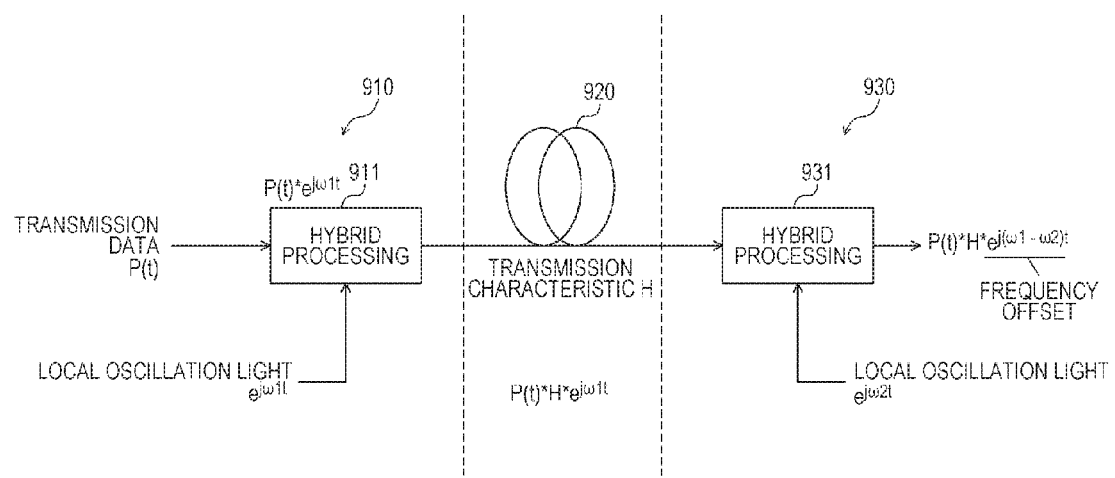
FIG. 9 illustrates an example of a frequency offset according to the embodiment.

FIG. 9 illustrates an example of the frequency offset according to the embodiment. In FIG. 9, transmission of the optical signal from the transmission section 910 to the reception section 930 via the transmission path 920 is described. The transmission path 920 corresponds, for example, to the above transmission path 820. The reception section 930 corresponds, for example, to the above digital coherent receiver 500.

In the transmission section 910, a signal $P(t)*e^{j\omega 1 t}$ is generated by a hybrid processing 911 which mixes transmission data (t) and local oscillation light $e^{j\omega 1 t}$ of the frequency ω1 with each other. The signal $P(t)*e^{j\omega 1 t}$ propagates in the transmission path 920 and thereby turns to a signal $P(t)*H*e^{j\omega 1 t}$ by a transmission characteristic H of the transmission path 920. Then, the signal is input into the reception section 930.

The reception section 930 gets a signal $P(t)*H*e^{j(\omega 1-\omega 2)t}$ by a hybrid processing 931 which mixes the input signal $P(t)*H*e^{j\omega 1 t}$ and local oscillation light $e^{j\omega 2 t}$ of the frequency ω2 with each other. The hybrid processing 931 is, for example, a processing performed by the above coherent light-receiving front end 510. $e^{j(\omega 1-\omega 2)t}$ among the signal $P(t)*H*e^{j(\omega 1-\omega 2)t}$ thus obtained is a frequency offset caused by a difference between a frequency ω1 of the local oscillation light in the transmission section 910 and a frequency ω2 of the local oscillation light in the reception section 930.

Here, a TS symbol included in the transmission data P(t) is known. For this reason, the AEQ_TS 120 may calculate the transmission characteristic H of the transmission path 920 by multiplying the signal $P(t)*H*e^{j(\omega 1-\omega 2)t}$ at the estimated TS position by an inverse number of the known TS symbol and an inverse number of the estimation value of the frequency offset. Then, the AEQ_TS 120 may calculate out an inverse number $H^{-1}$ of the calculated transmission characteristic H as an initial value of the tap coefficient.

Thus, the AEQ_TS 120 calculates the transmission characteristic H of the transmission path 920 based on the estimation value of the frequency offset and then calculates out an initial value ($H^{-1}$) of the tap coefficient. For this reason, to calculate out an appropriate initial value of the tap coefficient, it is requested to derive a correct estimation value of the frequency offset.

Estimation of Frequency Offset According to Embodiment

Figure 10:
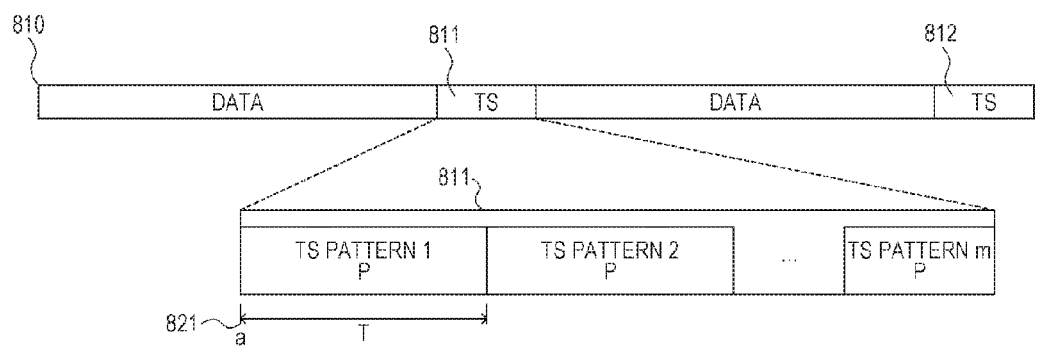
FIG. 10 illustrates an example of estimation of the frequency offset according to the embodiment.

FIG. 10 illustrates an example of estimation of the frequency offset according to the embodiment. In FIG. 10, description of a section similar to a section illustrated in FIG. 8 is omitted by assigning the same reference numeral. As illustrated in FIG. 10, the TS 811 includes, for example, m TS patterns 1, 2, . . . , m at regular repeating intervals. TS patterns 1, 2, . . . , m are patterns P (TS symbol) identical with each other.

Assuming that P(t)=P since TS patterns 1, 2, . . . , m are known, and the estimated TS position 821 is a since the transmission characteristic does not depend on the time, a first TS pattern of the TS 811 is $TS(1)=P*H*e^{j(\omega 1-\omega 2)a}$. A second TS pattern 2 of the TS 811 is $TS(2)=P*H*e^{j(\omega 1-\omega 2)(a+T)}$.

A correlation value of those TS patterns is calculated as $TS(1)*TS(2)^{-1}=e^{j(\omega 1-\omega 2)T}$. The frequency offset may be estimated by dividing the correlation value by the repeating interval T. That is, the AEQ_TS 120 may estimate the frequency offset based on a first TS pattern and a second TS pattern of the TS 811 from $TS(1)*TS(2)^{-1}/T$.

Similarly, the AEQ_TS 120 may estimate the frequency offset based on a second TS pattern and a third TS pattern of the TS 811, for example, from $TS(2)*TS(3)^{-1}/T$. Thus, the AEQ_TS 120 may estimate multiple frequency offsets by estimating the frequency offset for a combination of multiple TS patterns in the TS 811.

Combination of multiple TS patterns in the TS 811 may include, for example, TS patterns adjacent to each other in the TS 811. In this case, the number of combinations of multiple TS patterns in the TS 811 is (m−1) at most.

Although estimation of the frequency offset based on one TS 811 among TS 811, 812, . . . , the frequency offset may be estimated based on multiple TS among TS 811, 812, . . . .

Here, for example, longer the distance of the transmission path 820, larger the noise applied in the transmission path 820. For this reason, an error is caused in the channel estimation of determining noise and inverse transmission characteristic in the transmission path 820, and thereby an error of the above correlation value becomes larger. For example, assuming that noise n is applied in the transmission path 820, the frequency offset is $e^{j(\omega 1-\omega 2)}+n$. The noise n includes, for example, amplified spontaneous emission (ASE) noise and channel estimation error.

For this reason, when noise n is large, it is impossible to estimate the frequency offset accurately. As a result, it is impossible to calculate an appropriate initial value of the above tap coefficient. The appropriate initial value of the tap coefficient is, for example, a value close to an inverse number $H^{-1}$ of an actual transmission characteristic of the transmission path 820.

On the other hand, the AEQ_TS 120 of the adaptive equalization circuit 100 according to the embodiment performs selection of a frequency offset effected by the noise power and averaging of the frequency offset. Thus, effects by noise n in the calculation of the frequency offset may be reduced, and an appropriate (highly accurate) tap coefficient may be calculated.

Selection of a frequency offset effected by the noise power is a processing of excluding a frequency offset estimated when the noise power is large since reliability of the frequency offset is low. Averaging of the frequency offset is a processing of calculating an average value of estimation values of frequency offsets not excluded by the selection due to the noise power. Thus, noise effects may be reduced and estimation accuracy of the frequency offset may be enhanced. Thus, channel estimation may be performed with high accuracy, and an appropriate initial value of the tap coefficient of the AEQ 110 may be calculated.

AEQ_TS According to Embodiment

Figure 11:
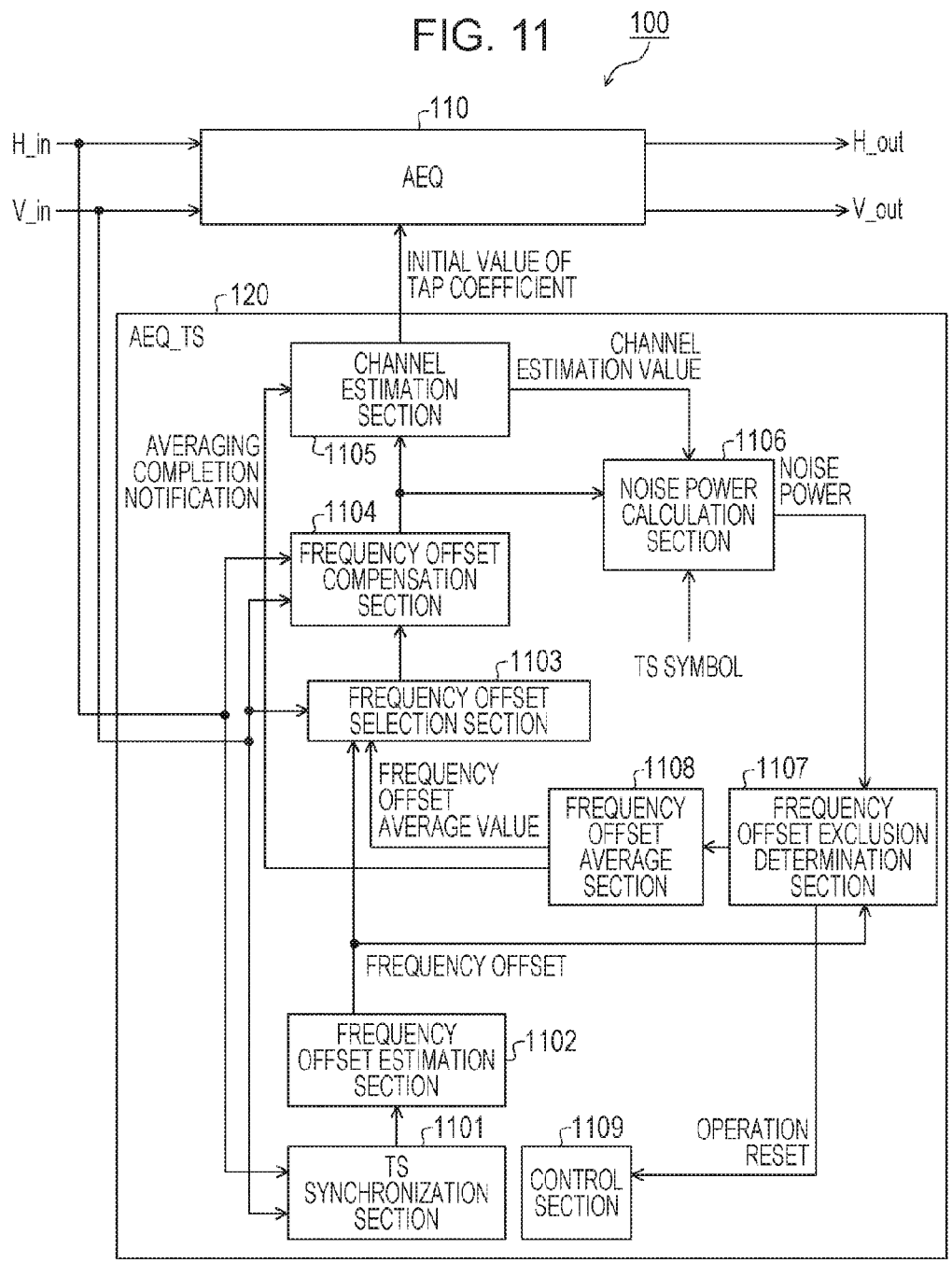
FIG. 11 illustrates an example of an AEQ_TS according to the embodiment.

FIG. 11 illustrates an example of an AEQ_TS according to the embodiment. The AEQ_TS 120 illustrated in FIG. 1 includes, for example, a TS synchronization section 1101, a frequency offset estimation section 1102, a frequency offset selection section 1103, a frequency offset compensation section 1104, and a channel estimation section 1105, as illustrated in FIG. 11. The AEQ_TS 120 includes a noise power calculation section 1106, a frequency offset exclusion determination section 1107, a frequency offset average section 1108 and a control section 1109.

The TS synchronization section 1101 estimates a TS position (for example, estimated TS position 821 illustrated in FIG. 8) which is a position of the TS included in a signal input into the AEQ_TS 120. Then, the TS synchronization section 1101 acquires, based on the estimated TS position, a TS pattern included in the signal input into the AEQ_TS 120. The TS synchronization section 1101 outputs the acquired TS pattern to the frequency offset estimation section 1102.

The frequency offset estimation section 1102 estimates, based on a TS pattern output from the TS synchronization section 1101, a frequency offset in the digital coherent receiver 500. Then, the frequency offset estimation section 1102 notifies the estimated frequency offset to the frequency offset selection section 1103 and the frequency offset exclusion determination section 1107.

The frequency offset selection section 1103 selects a frequency offset used in the frequency offset compensation section 1104. That is, before an averaging completion notification is output from the frequency offset average section 1108, the frequency offset selection section 1103 selects a frequency offset notified from the frequency offset estimation section 1102.

After the averaging completion notification is output from the frequency offset average section 1108, the frequency offset selection section 1103 selects a frequency offset notified from the frequency offset average section 1108. The frequency offset selection section 1103 notifies the selected frequency offset to the frequency offset compensation section 1104.

The frequency offset compensation section 1104 compensates the frequency offset of signals input into the AEQ_TS 120, based on the estimation value of the frequency offset notified from the frequency offset selection section 1103. Then, the frequency offset compensation section 1104 outputs the signal with the compensated frequency offset to the channel estimation section 1105 and the noise power calculation section 1106.

The channel estimation section 1105 performs channel estimation based on a signal output from the frequency offset compensation section 1104. Then, the channel estimation section 1105 notifies the channel estimation value obtained by channel estimation to the noise power calculation section 1106. When the averaging completion notification is output from the frequency offset average section 1108, the channel estimation section 1105 calculates an initial value of the tap coefficient of the AEQ 110 based on the channel estimation value. Then, the channel estimation section 1105 outputs the calculated initial value of the tap coefficient to the AEQ 110.

The noise power calculation section 1106 calculates the noise power of a signal input into the AEQ_TS 120 based on a signal output from the frequency offset compensation section 1104, a channel estimation value notified from the channel estimation section 1105, and a known TS symbol. Then, the noise power calculation section 1106 notifies the calculated noise power to the frequency offset exclusion determination section 1107.

For example, assume that a transmitted TS pattern (known TS symbol) is P, and a received TS pattern is P'. Here, the received TS pattern is P'=(P+n)*H since the transmission characteristic H and noise n are applied to the received TS pattern. Therefore, noise power=$|P'*H^{-1}-P|^2=|(P+n)*H*H^{-1}-P|^2=|n|^2$.

That is, the noise power calculation section 1106 calculates the square of the difference between the result of multiplication of a signal (P') output from the frequency offset compensation section 1104 by an inverse number ($H^{-1}$) of the channel estimation value notified from the channel estimation section 1105, and a known TS symbol (P). Thus, the noise power $|n|^2$ may be calculated.

The frequency offset exclusion determination section 1107 compares a noise power notified from the noise power calculation section 1106 and a predetermined threshold with each other every time the estimation value of a new frequency offset is notified from the frequency offset estimation section 1102. Then, only when the noise power is smaller than the threshold, the frequency offset exclusion determination section 1107 notifies the estimation value of the frequency offset notified from the frequency offset estimation section 1102 to the frequency offset average section 1108. Thus, among frequency offsets estimated by the frequency offset estimation section 1102, a frequency offset estimated based on a TS pattern whose noise power is larger than the threshold may be excluded from the averaging target in the frequency offset average section 1108.

The frequency offset exclusion determination section 1107 counts up comparison frequency between the noise power notified from the noise power calculation section 1106 and a predetermined threshold as an exclusion determination count of the estimation value of the frequency offset. Then, when the determination count exceeds a predetermined value, the frequency offset exclusion determination section 1107 instructs the control section 1109 to reset the operation.

The frequency offset average section 1108 holds the estimation value of the frequency offset notified from the frequency offset exclusion determination section 1107. The frequency offset average section 1108 counts up the frequency offset notification frequency from the frequency offset exclusion determination section 1107 as the frequency offset hold number.

Then, when the frequency offset hold number reaches a predetermined value, the frequency offset average section 1108 averages held frequency offsets. Then, the frequency offset average section 1108 outputs an averaging completion notification indicating that averaging of frequency offsets is completed, to the frequency offset selection section 1103 and the channel estimation section 1105. The frequency offset estimation section 1108 notifies the averaged frequency offset (average value of frequency offset) to the frequency offset selection section 1103.

When instructed by the frequency offset exclusion determination section 1107 to reset the operation, the control section 1109 resets the operation of the AEQ_TS 120. Thus, processings by the sections of the AEQ_TS 120 are repeated. For example, when the operation reset is instructed, the control section 1109 causes the frequency offset average section 1108 to discard the estimation value of the frequency offset being held and causes the TS synchronization section 1101 to perform estimation (TS synchronization) of the TS position.

This enables, for example, to set the initial value of the tap coefficient based on a less reliable frequency offset estimated in the period where a large noise power continues or occurs frequently.

If a large value is calculated as the noise power of TS pattern due to estimation of a wrong TS position in the TS synchronization section 1101, estimation of the TS position and holding of the frequency offset may be performed again. Thus, estimation error of the TS position may be recovered.

A calculation section configured to calculate noise power of the TS pattern repeatedly included in a signal input into the adaptive equalization circuit 100 may be implemented, for example, by the noise power calculation section 1106. An average section configured to average estimation values of frequency offsets based on the TS pattern where the noise power is equal to or smaller than the predetermined power may be implemented, for example, by the frequency offset exclusion determination section 1107 and the frequency offset average section 1108.

A compensation section configured to compensate the frequency offset of the TS pattern based on an averaged estimation value may be implemented, for example, by the frequency offset selection section 1103 and the frequency offset compensation section 1104. A calculation section configured to calculate a setting value in the AEQ 110 based on a TS pattern with the frequency offset compensated may be implemented, for example, by the channel estimation section 1105.

An acquisition section configured to estimate the position of the TS pattern in a signal input into the adaptive equalization circuit 100 and acquire the TS pattern based on the estimated position may be implemented, for example, by the TS synchronization section 1101. A control section configured to control to discard the held estimation value may be implemented, for example, by the frequency offset exclusion determination section 1107 and the control section 1109.

Processing by AEQ_TS According to Embodiment

Figure 12:
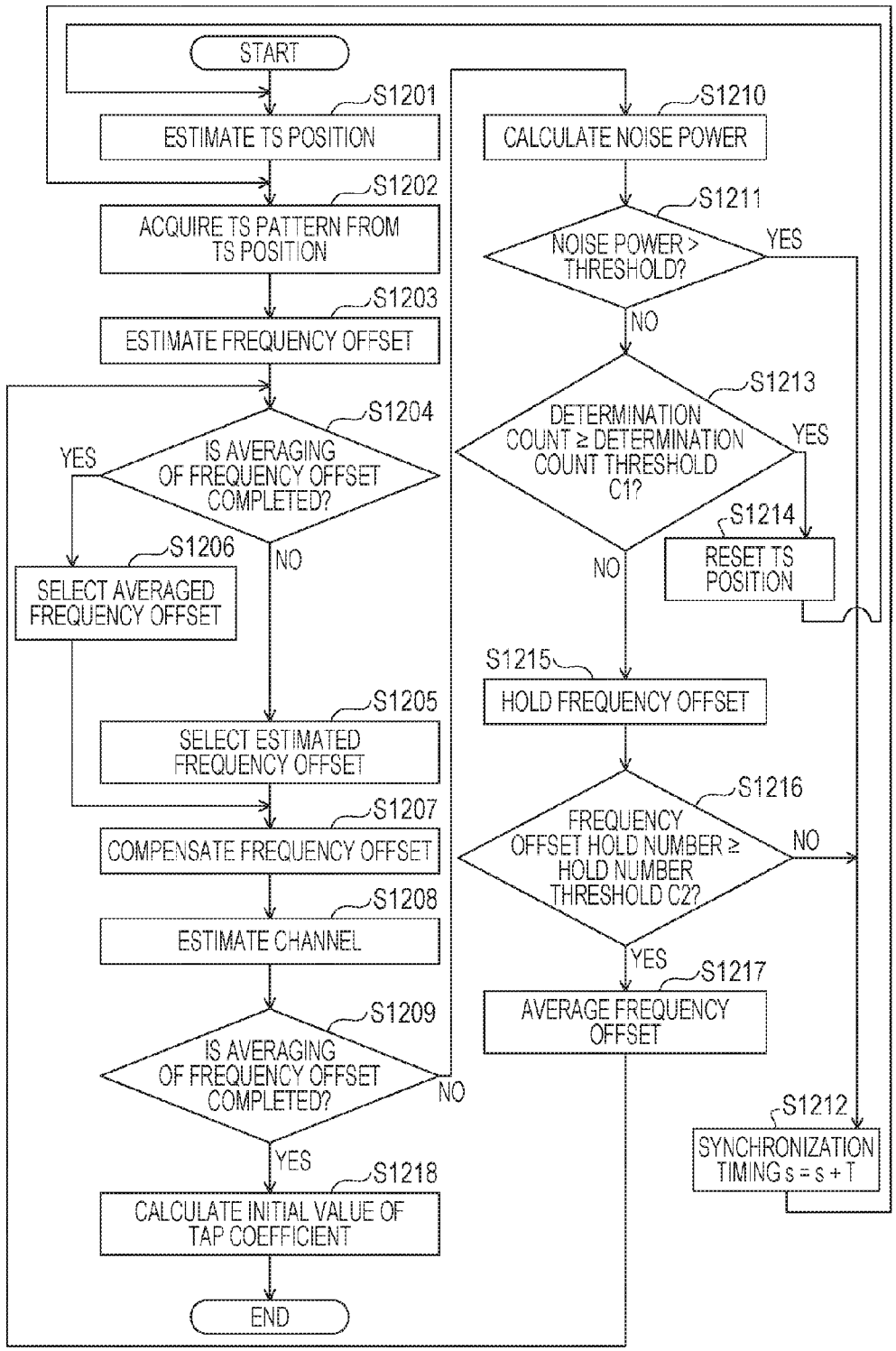
FIG. 12 is a flowchart illustrating an example of a processing by the AEQ_TS according to the embodiment.

FIG. 12 is a flowchart illustrating an example of a processing by the AEQ_TS according to the embodiment. The AEQ_TS 120 sets, for example, a determination count threshold C1 and a hold number threshold C2 and performs steps illustrated in FIG. 12. Here, assume C2<C1≤m. m is the number of repetitive patterns included in one TS (see FIG. 10).

First, the AEQ_TS estimates the TS position which is a position (timing) of the TS in a received signal (step S1201). The TS position estimated in the step S1201 is, for example, the estimated TS position 821 illustrated in FIG. 8. The step S1201 is performed, for example, by the TS synchronization section 1101 illustrated in FIG. 11.

Next, the AEQ_TS 120 acquires a pair of TS patterns from the TS position estimated in the step S1201 (step S1202). The pair of TS patterns are, for example, a TS pattern 1 in a synchronization timing s and a TS pattern 2 in a synchronization timing s+T. The synchronization timing s is, for example, a TS position estimated in the step S1201 as a default, and is shifted by T in a step S1212 described below. T is, for example, a known repetition period of a TS pattern illustrated in FIG. 10. The step S1202 is performed, for example, by the TS synchronization section 1101 illustrated in FIG. 11.

Next, the AEQ_TS 120 estimates the frequency offset based on the pair of TS patterns acquired in the step S1202 (step S1203). The step S1202 is performed, for example, by the frequency offset estimation section 1102 illustrated in FIG. 11.

Next, the AEQ_TS 120 determines whether averaging of the frequency offset is completed (step S1204). The step S1204 is performed by the frequency offset selection section 1103 illustrated in FIG. 11, for example, based on the averaging completion notification output from the frequency offset average section 1108 illustrated in FIG. 11.

In the step S1204, when averaging of the frequency offset is not completed (step S1204: No), the AEQ_TS 120 selects the frequency offset estimated in the step S1203 (step S1205) and proceeds to the step S1207. The step S1205 is performed, for example, by the frequency offset estimation section 1103 illustrated in FIG. 11.

In the step S1204, when averaging of the frequency offset is completed (step S1204: Yes), the AEQ_TS 120 selects the averaged frequency offset (step S1206). The step S1206 is performed, for example, by the frequency offset selection section 1103 illustrated in FIG. 11.

Next, the AEQ_TS 120 compensates the frequency offset of the signal input into the AEQ_TS 120 based on the frequency offset selected in the step S1205 or step S1206 (step S1207). The step S1207 is performed, for example, by the frequency offset compensation section 1104 illustrated in FIG. 11.

Next, the AEQ_TS 120 performs channel estimation based on the signal whose frequency offset is compensated in the step S1207 (step S1208). The step S1208 is performed, for example, by the channel estimation section 1105 illustrated in FIG. 11.

Next, the AEQ_TS 120 determines whether averaging of the frequency offset is completed (step S1209). The step S1209 is performed by the channel estimation section 1105 illustrated in FIG. 11, for example, based on the averaging completion notification output from the frequency offset average section 1108 illustrated in FIG. 11.

In the step S1209, when averaging of the frequency offset is not completed (step S1209: No), the AEQ_TS 120 calculates the noise power of the signal input into the AEQ_TS 120 (step S1210). For example, the AEQ_TS 120 calculates the noise power based on the signal whose frequency offset compensated in the step S1207, the channel estimation value obtained by channel estimation in the step S1208 and a known TS symbol. The step S1210 is performed, for example, by the noise power calculation section 1106 illustrated in FIG. 11.

Next, the AEQ_TS 120 determines whether the noise power calculated in the step S1210 is larger than a predetermined threshold (step S1211). The step S1211 is performed, for example, by the frequency offset exclusion determination section 1107 illustrated in FIG. 11.

In the step S1211, when the noise power is larger than a predetermined value (step S1211: Yes), the AEQ_TS 120 shifts the synchronization timing s by T (step S1212) and returns to the step S1202. Thus, the AEQ_TS 120 may estimate the frequency offset based on a next pair of repetitive patterns while excluding the frequency offset estimated in the last step S1203 from the averaging target. The step S1212 is performed, for example, by the TS synchronization section 1101 illustrated in FIG. 11.

In the step S1211, when the noise power is not larger than a threshold (step S1211: No), the AEQ_TS 120 determines whether the current determination count is larger than the determination count threshold C1 (step S1213). The determination count is a number of frequency offset exclusion determination, that is, a number of TS patterns used to determine whether the noise power is larger than a threshold. The step S1213 is performed, for example, by the frequency offset exclusion determination section 1107 illustrated in FIG. 11.

In the step S1213, when the determination count is larger than the determination count threshold C1 (step S1213: Yes), the AEQ_TS 120 resets the TS position estimated in the step S1201 (step S1214), and returns to the step S1201. When resetting the TS position, the AEQ_TS 120 also resets the above determination count and a frequency offset hold number described below. Thus, the processing of calculating an initial value of the tap coefficient may be repeated from estimation of the TS position. At that time, the AEQ_TS 120 also may reset a frequency offset held in the step S1215 described below.

In the step S1213, when the determination count is smaller than the determination count threshold C1 (step S1213: No), the AEQ_TS 120 holds the frequency offset estimated in the step S1203 (step S1215). The step S1215 is performed, for example, by the frequency offset average section 1108 illustrated in FIG. 11.

Next, the AEQ_TS 120 determines whether the current frequency offset hold number is larger than the above hold number threshold C2 (step S1216). The frequency offset hold number is a number of times when the frequency offset is held in the step S1215. For example, an initial value of the frequency offset hold number is "0", which is counted up every time the step S1215 is performed. The step S1216 is performed, for example, by the frequency offset exclusion determination section 1107 illustrated in FIG. 11.

In the step S1216, when the frequency offset hold number is smaller than the hold number threshold C2 (step S1216: No), the AEQ_TS 120 proceeds to the step S1212. The AEQ_TS 120 may estimate the frequency offset based on a next pair of repetitive patterns while holding the frequency offset estimated in the last step S1203 as the averaging target.

In the step S1216, when the frequency offset hold number is larger than the hold number threshold C2 (step S1216: Yes), the AEQ_TS 120 proceeds to the step S1217. That is, the AEQ_TS 120 averages frequency offsets of the number corresponding to the hold number threshold C2 which are held in the step S1215 (step S1217) and then proceeds to the step S1204. The step S1217 is performed, for example, by the frequency offset average section 1108 illustrated in FIG. 11. Averaging of frequency offsets ends in the step S1217.

In the step S1209, when averaging of the frequency offset is completed (step S1209: Yes), the AEQ_TS 120 proceeds to the step S1218. That is, the AEQ_TS 120 calculates the initial value of the tap coefficient based on the frequency offset averaged in the step S1217 (step S1218), and ends a series of processings. The step S1218 is performed, for example, by the channel estimation section 1105 illustrated in FIG. 11. The AEQ_TS 120 sets the initial value of the tap coefficient calculated in the step S1218 to the AEQ 110.

Processing of resetting and repeating estimation of the TS position when the determination count reaches the determination count threshold C1 is not limited to the processing described above. For example, when the determination count reaches the determination count threshold C1, the above determination count, frequency offset hold number and a held frequency offset may be reset and the processing may proceed to the step S1212. Also in this case, by repeating the step of holding the frequency offset, deterioration of the reception quality may be avoided, for example, by setting the initial value of the tap coefficient based on a less reliable frequency offset estimated in the period where a large noise power continues or occurs frequently.

Frequency Offset Exclusion Determination Section According to Embodiment

Figure 13:
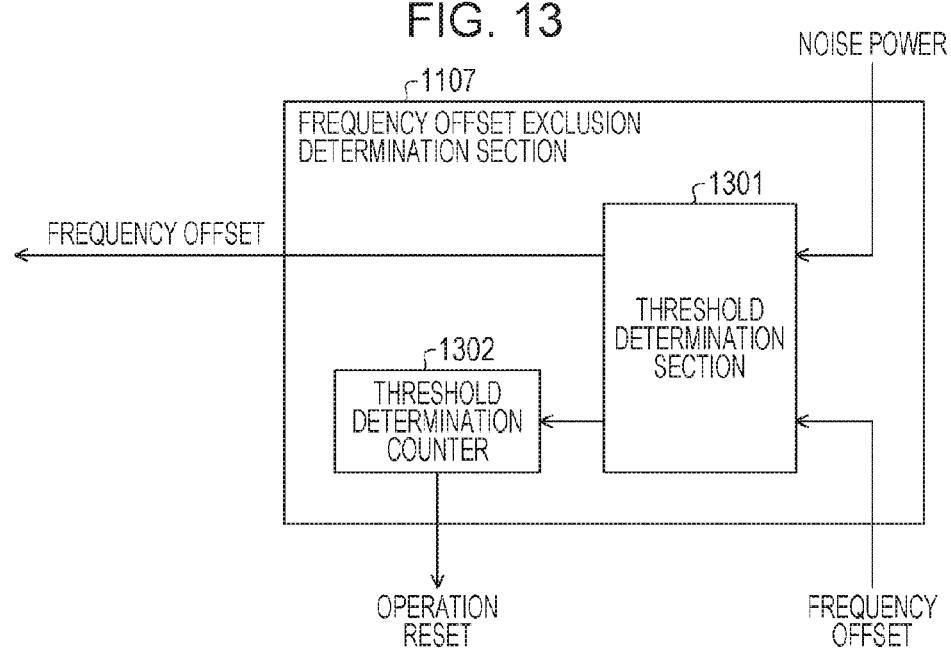
FIG. 13 illustrates an example of a frequency offset exclusion determination section according to the embodiment.

FIG. 13 illustrates an example of the frequency offset exclusion determination section according to the embodiment. The frequency offset exclusion determination section 1107 illustrated in FIG. 11 includes, for example, a threshold determination section 1301 and a threshold determination counter 1302 as illustrated in FIG. 13.

The threshold determination section 1301 compares the noise power notified by the noise power calculation section 1106 (for example, see FIG. 11) and a predetermined threshold with each other. Then, when the noise power is smaller than the threshold, the threshold determination section 1301 notifies the frequency offset notified from the frequency offset estimation section 1102 to the frequency offset average section 1108 (for example, see FIG. 11).

When the noise power is larger than the threshold, the threshold determination section 1301 does not notify the frequency offset notified from the frequency offset estimation section 1102 to the frequency offset average section 1108. Thus, estimation result of the frequency offset for the noise power larger than the threshold may be excluded from the averaging target of the frequency offset in the frequency offset average section 1108.

The threshold determination section 1301 causes the threshold determination counter 1302 to count up by comparing the noise power and the threshold with each other. The threshold determination counter 1302 is a counter configured to count the determination count in the threshold determination section 1301. When a count value of the determination count is larger than the threshold, the threshold determination counter 1302 instructs the control section 1109 (for example, see FIG. 11) to reset the operation. Thus, when the determination count reaches a threshold, calculation of the initial value of the tap coefficient may be repeated.

Frequency Offset Average Section According to Embodiment

Figure 14:
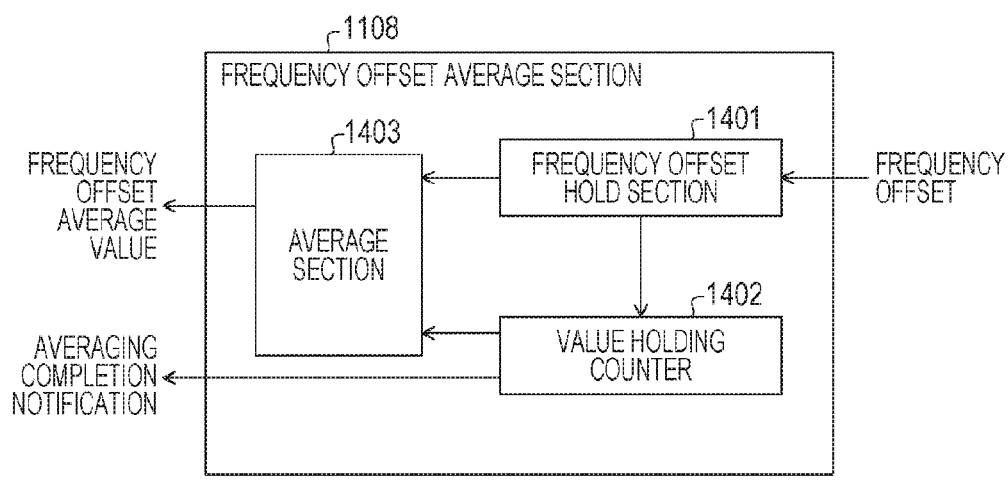
FIG. 14 illustrates an example of a frequency offset average section according to the embodiment.

FIG. 14 illustrates an example of the frequency offset average section according to the embodiment. The frequency offset average section 1108 illustrated in FIG. 11 includes, for example, a frequency offset hold section 1401, a value holding counter 1402, and an average section 1403, as illustrated in FIG. 14.

The frequency offset hold section 1401 holds the frequency offset notified from the frequency offset exclusion determination section 1107 (for example, see FIG. 11). The frequency offset hold section 1401 causes the value holding counter 1402 to count up by newly holding a frequency offset.

The value holding counter 1402 is a counter configured to count the hold number of frequency offsets in the frequency offset hold section 1401. When the count value of the hold number is larger than the threshold, the value holding counter 1402 instructs the average section 1403 to average the frequency offset and outputs the averaging completion notification to the frequency offset selection section 1103 and the channel estimation section 1105 (for example, see FIG. 11).

When instructed by the value holding counter 1402 to average the frequency offset, the average section 1403 averages frequency offsets held by the frequency offset hold section 1401. Then, the average section 1403 notifies the averaged frequency offset (average value of frequency offset) to the frequency offset selection section 1103.

Example of Other Processing by AEQ_TS According to Embodiment

Figure 15:
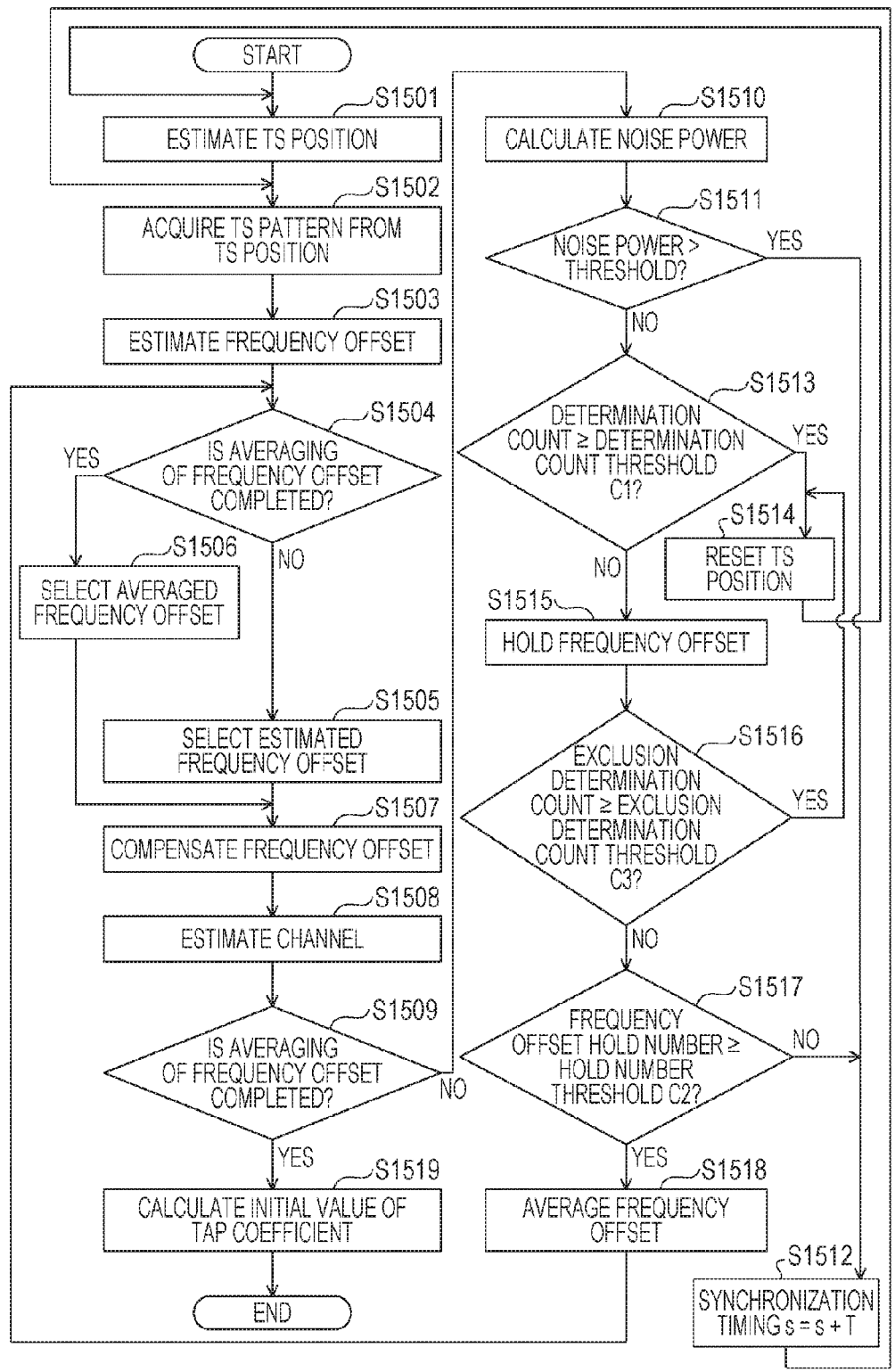
FIG. 15 is a flowchart illustrating another example of the processing by the AEQ_TS according to the embodiment.

FIG. 15 is a flowchart illustrating another example of the processing by the AEQ_TS according to the embodiment. The AEQ_TS 120 may set, for example, the determination count threshold C1, the hold number threshold C2, and exclusion determination count threshold C3, and performs steps illustrated in FIG. 15. Here, assume C2<C3<C1≤m. m is the number of repetitive patterns included in one TS (see FIG. 10). The exclusion determination count threshold C3 may be smaller than the hold number threshold C2. Steps S1501 to S1515 illustrated in FIG. 15 are similar with steps S1201 to S1215 illustrated in FIG. 12.

Next to the step S1515, the AEQ_TS 120 determines whether the current exclusion determination count threshold is larger than the above exclusion determination count threshold C3 (step S1516). The exclusion determination count is a count of times that the estimated frequency offset is determined to be excluded from the averaging target. For example, the initial value of the exclusion determination count is "0", which is counted up every time the step proceeds from the step S1511 to the step S1512. The step S1516 is performed, for example, by the frequency offset exclusion determination section 1107 illustrated in FIG. 11.

In the step S1516, when the exclusion determination count is smaller than the exclusion determination count threshold C3 (step S1516: No), the AEQ_TS 120 proceeds to the step S1517. Steps S1517 to S1519 illustrated in FIG. 15 are similar with steps S1216 to S1218 illustrated in FIG. 12.

In the step S1516, when the exclusion determination count is larger than the exclusion determination count threshold C3 (step S1516: Yes), the AEQ_TS 120 proceeds to the step S1514. Thus, the processing of calculating the initial value of the tap coefficient may be repeated from estimation of the TS position, and thereby, for example, compared with the case where the TS position is reset based on the determination of the determination count only, the TS position may be reset in the early stage when a large noise power continues or occurs frequently.

This reduces the processing amount in a period where it is impossible to estimate accurate frequency offset due to continuance or frequent occurrence of a large noise power, and power consumption of the system may be saved. Resetting the TS position at the early stage enables to repeat the processing from estimation of the TS position at the early stage. Thus, operation delay due to continuance or frequent occurrence of a large noise power may be reduced.

Although determination of the exclusion determination count performed between holding of the frequency offset and determination of the frequency offset hold number is described above, timing of determining the exclusion determination count is not limited thereto. For example, the AEQ_TS 120 may determine the exclusion determination count immediately after the exclusion determination count is counted up in the step S1512 following the step S1511. The step S1513 among steps illustrated in FIG. 15 may be omitted.

Although a processing of resetting and repeating estimation of the TS position when the determination count reaches the determination count threshold C3 is described above, the processing is not limited thereto. For example, when the exclusion determination count reaches the exclusion determination count threshold C3, the above determination count, frequency offset hold number, exclusion determination count and held frequency offset may be reset and the processing may proceed to the step S1512. Also in this case, by repeating the step of holding the frequency offset, deterioration of the reception quality may be avoided, for example, by setting the initial value of the tap coefficient based on a less reliable frequency offset estimated in the period where a large noise power continues or occurs frequently.

Figure 16:
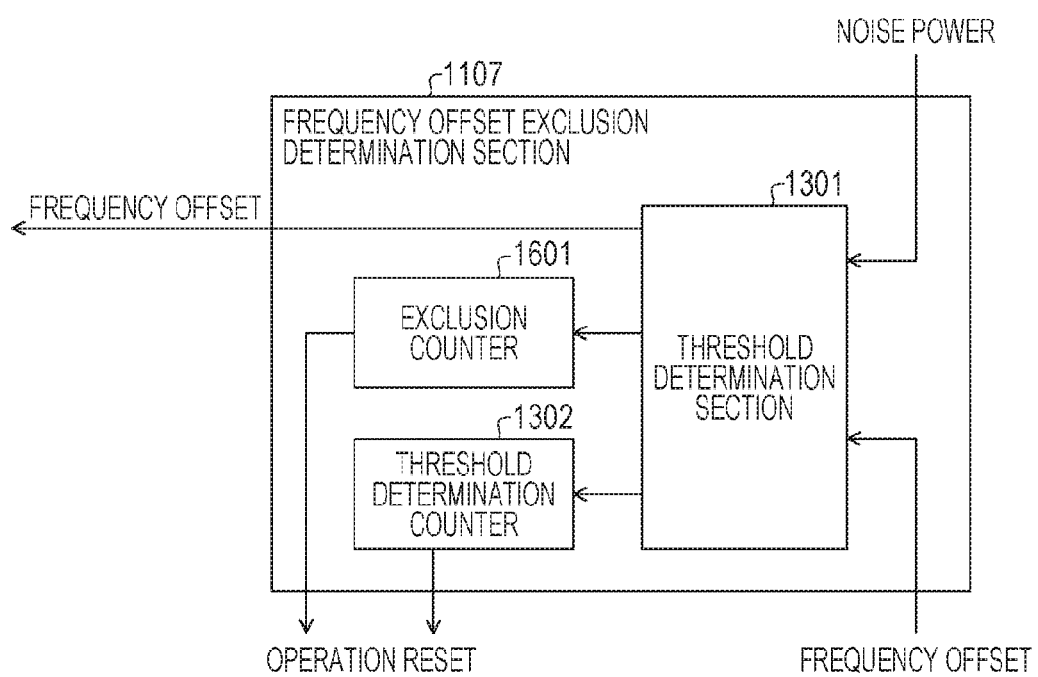
FIG. 16 illustrates another example of the frequency offset exclusion determination section according to the embodiment.

Another Example of Frequency Offset Exclusion Determination Section According to Embodiment FIG. 16 illustrates another example of the frequency offset exclusion determination section according to the embodiment. In FIG. 16, description of a section similar to a section illustrated in FIG. 13 is omitted by assigning the same reference numeral. When the AEQ_TS 120 performs the processing illustrated in FIG. 15, the frequency offset exclusion determination section 1107 illustrated in FIG. 11 includes, for example, an exclusion counter 1601 as illustrated in FIG. 16, in addition to the configuration illustrated in FIG. 13.

The threshold determination section 1301 causes the exclusion counter 1601 to count up every time the noise power is determined to be larger than a threshold. The exclusion counter 1601 is a counter configured to count the number of times that the frequency offset is excluded when the threshold determination section 1301 determines that the noise power is larger than the threshold. When a count value of the determination count is larger than a threshold, the exclusion counter 1601 instructs the control section 1109 (for example, see FIG. 11) to reset the operation. Thus, when the determination count reaches a threshold, calculation of the initial value of the tap coefficient may be repeated.

Thus, the adaptive equalization circuit 100 according to the embodiment averages multiple estimation values of the frequency offsets based on a TS pattern in which the calculated noise power is equal to or smaller than the predetermined power, among the estimation values of the frequency offsets based on the TS pattern included in an input signal. Thus, noise effects of the transmission path on estimation of the frequency offset may be reduced and a highly accurate estimation value of the frequency offset may be obtained.

Also, the adaptive equalization circuit 100 according to the embodiment calculates a setting value of the AEQ110 according to a TS pattern subjected to the frequency offset compensated based on an averaged estimation value. Thus, a distortion generated in the optical signal by transmission path characteristics may be compensated by the AEQ110 with high accuracy. Therefore, for example, at least occurrence frequency of the transmission error may be reduced or distance of the transmission path may be extended.

As described above, the adaptive equalization circuit, digital coherent receiver and adaptive equalization method are capable of reducing noise effects and thereby obtaining a highly accurate estimation value of the frequency offset.

For example, due to increase of the transmission traffic in the optical communication in recent years, there is a strong demand for introduction of a next generation optical transmission system with a transmission rate higher than 100 Gbps. In the next generation optical transmission system, there is also a demand for implementation of a transmission distance longer than conventional systems.

However, if a transmission rate higher than 100 Gbps is implemented, compensation performance of the conventional optical dispersion compensation technique reaches the limit thereof. For this reason, there is a demand for a digital coherent receiver which is capable of compensating waveform distortion in a wide range and with high precision.

Meanwhile, according to the embodiment described above, for example, a highly accurate channel estimation is possible and thereby an initial value of the tap coefficient of the AEQ compensating transmission path characteristics more accurately may be set. Therefore, transmission path characteristics may be compensated accurately, and thereby, at least occurrence frequency of the transmission error may be reduced or distance of the transmission path may be extended.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An adaptive equalization circuit, comprising:
a calculation circuit configured to calculate a noise power of a predetermined training sequence pattern repeatedly included in a first signal input into an adaptive equalizer, based on a second signal obtained by compensating the first signal by a compensation circuit, a channel estimation value based on the second signal, and the predetermined training sequence pattern; and
an average circuit configured to obtain an average value of estimation values of frequency offsets based on the predetermined training sequence pattern having the noise power equal to or smaller than a predetermined power, among estimation values of frequency offsets based on the predetermined training sequence pattern, wherein
the compensation circuit is configured to compensate a frequency offset of the predetermined training sequence pattern based on the average value and thereby obtain the second signal, and
the adaptive equalizer is configured to perform adaptive equalization processing of the first signal with a setting value based on the second signal.

2. The adaptive equalization circuit according to claim 1, wherein the average circuit is configured to exclude, from the estimation values of the frequency offsets based on the predetermined training sequence pattern repeatedly included, the estimation value of the frequency offset based on the predetermined training sequence pattern with the noise power higher than a predetermined power, and obtain an average value of the estimation values of the frequency offsets based on the predetermined training sequence pattern with the noise power equal to or smaller than the predetermined power.

3. The adaptive equalization circuit according to claim 1, wherein the average circuit is configured to determine an average value of a predetermined number of the estimation values when the number of the estimation values reaches the predetermined number.

4. The adaptive equalization circuit according to claim 3, further comprising a control circuit configured to perform control of discarding the estimation values when a count of determinations on whether or not the noise power is equal to or smaller than the predetermined power reaches a threshold that is larger than the predetermined number.

5. The adaptive equalization circuit according to claim 4, further comprising an acquisition circuit configured to estimate positions of the predetermined training sequence pattern in the first signal and acquire the predetermined training sequence pattern from the first signal based on the estimated positions, wherein
the calculation circuit is configured to calculate the noise power based on the acquired the predetermined training sequence pattern;
the average circuit is configured to hold the estimation values of the frequency offsets based on the predetermined training sequence pattern having the noise power equal to or smaller than the predetermined power, among the estimation values of the frequency offsets based on the acquired predetermined training sequence pattern; and
the control circuit is configured to, when the count of determinations on whether or not the noise power is equal to or smaller than the predetermined power reaches the threshold, control of discarding the estimation values and re-estimating the positions of the acquired predetermined training sequence pattern.

6. The adaptive equalization circuit according to claim 3, further comprising a control circuit configured to discard the estimation values when a count of determinations that the noise power is larger than the predetermined power reaches a threshold.

7. The adaptive equalization circuit according to claim 6, further comprising an acquisition circuit configured to estimate positions of the predetermined training sequence pattern included in the first signal and acquire the predetermined training sequence pattern from the first signal based on the estimated positions, wherein
the calculation circuit is configured to calculate the noise power based on the predetermined training sequence pattern,
the average circuit is configured to obtain an average value of the estimation values of the frequency offsets based on the predetermined training sequence pattern having the noise power equal to or lower than the predetermined power, among the estimation values of the frequency offsets based on the acquired predetermined training sequence pattern, and
the control circuit is configured to, when the count of determinations that the noise power is larger than the predetermined power reaches the threshold, perform control of discarding the estimation values and re-estimating the positions of the acquired predetermined training sequence pattern.

8. The adaptive equalization circuit according to claim 1, wherein the adaptive equalizer performs the adaptive equalization processing with a finite impulse response (FIR) filter configured to perform a filtering according to a set tap coefficient, and sets an initial value of the tap coefficient based on the predetermined training sequence pattern whose frequency offsets are compensated.

9. The adaptive equalization circuit according to claim 8, wherein the adaptive equalizer is configured to set, as the initial value, a tap coefficient calculated from the channel estimation values based on the predetermined training sequence pattern whose frequency offsets are compensated.

10. The adaptive equalization circuit according to claim 1, wherein
the calculation circuit, the average circuit, the compensation circuit, and the adaptive equalization circuit are included in a digital circuit, and
the digital circuit is configured to include a field programmable gate array and/or a digital signal processor.

11. A digital coherent receiver, comprising:
a received light processing circuit configured to perform photoelectric conversion and digital conversion of light obtained by mixing signal light and local oscillation light;
a calculation circuit configured to calculate a noise power of a predetermined training sequence pattern repeatedly included in a first signal obtained by the received light processing circuit, based on a second signal obtained by compensating the predetermined training sequence pattern by a compensation circuit, a channel estimation value based on the second signal, and the predetermined training sequence pattern;
an average circuit configured to obtain an average value of estimation values of frequency offsets based on the predetermined training sequence pattern having the noise power equal to or smaller than a predetermined power, among estimation values of frequency offsets based on the predetermined training sequence pattern, the compensation circuit being configured to compensate a frequency offset of the predetermined training sequence pattern based on the average value and thereby obtain the second signal;
an adaptive equalizer configured to perform adaptive equalization processing of the first signal obtained by the received light processing circuit, with a setting value based on the second signal; and
a decode circuit configured to perform decoding based on the first signal resultant from the adaptive equalization processing by the adaptive equalizer.

12. An adaptive equalization method comprising:
calculating, by a digital circuit, a noise power of a predetermined training sequence pattern repeatedly included in a first signal, based on a second signal obtained by compensating the predetermined training sequence pattern, a channel estimation value based on the second signal, and the predetermined training sequence pattern;
obtaining, by the digital circuit, an average value of estimation values of frequency offsets based on the predetermined training sequence pattern each having the noise power equal to or smaller than a predetermined power, among estimation values of frequency offsets based on the predetermined training sequence pattern;
compensating, by the digital circuit, a frequency offset of the predetermined training sequence pattern based on the average value and thereby obtaining the second signal; and
performing, by the digital circuit, adaptive equalization processing of the first signal with a setting value based on the second signal.

* * * * *